United States Patent
Armknecht et al.

(10) Patent No.: US 10,447,696 B2
(45) Date of Patent: Oct. 15, 2019

(54) METHOD FOR PROVING RETRIEVABILITY OF INFORMATION

(71) Applicant: NEC Laboratories Europe GmbH, Heidelberg (DE)

(72) Inventors: Frederik Armknecht, Worms (DE); Jens-Matthias Bohli, Leimen (DE); Ghassan Karame, Heidelberg (DE); Christian Gorke, Mainz (DE)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 15/310,801

(22) PCT Filed: May 18, 2015

(86) PCT No.: PCT/EP2015/060917
§ 371 (c)(1),
(2) Date: Nov. 14, 2016

(87) PCT Pub. No.: WO2015/173434
PCT Pub. Date: Nov. 19, 2015

(65) Prior Publication Data
US 2017/0126684 A1 May 4, 2017

(30) Foreign Application Priority Data
May 16, 2014 (EP) .................... 14168694

(51) Int. Cl.
*H04L 29/06* (2006.01)
*G06F 21/64* (2013.01)

(52) U.S. Cl.
CPC ............ *H04L 63/10* (2013.01); *G06F 21/645* (2013.01); *H04L 63/123* (2013.01); *G06F 2221/2101* (2013.01); *G06F 2221/2115* (2013.01)

(58) Field of Classification Search
CPC ......... H04L 9/00; H04L 63/123; G07C 15/00; G06F 21/00; G06F 21/645; G11B 20/18;
(Continued)

(56) References Cited

U.S. PATENT DOCUMENTS

| 4,935,914 A | * | 6/1990 | Morita | ............... | G11B 7/004 369/116 |
| 6,934,846 B2 | * | 8/2005 | Szrek | .................. | G06F 7/58 380/251 |

(Continued)

FOREIGN PATENT DOCUMENTS

CN      103699851 A      4/2014

OTHER PUBLICATIONS

Hovav Shacham et al: Compact Proofs of Retrievability, Dec. 7, 2008 (Dec. 7, 2008), Advances in Cryptology—Asiacrypt 2008, Springer Berlin Heidelberg, Berlin, Heidelberg, Berlin, Heidelberg, pp. 90-107, XP047029863, pp. 92-94.
(Continued)

*Primary Examiner* — Thanhnga B Truong
(74) *Attorney, Agent, or Firm* — Leydig, Voit & Mayer, Ltd.

(57) ABSTRACT

A method for proving retrievability (POR) of information is performed in a memory available to one or more computation devices, wherein credentials between a user device, a storing device and an auditing device between each pair of said devices are exchanged and used for communication between them. The method includes encoding information to be stored on the storing device by the user device or the auditing device, storing the encoded information on the storing device, verifying the correctness of the stored information by the auditing device using unpredictable random information, transmitting correctness information to the user device, the correctness information being secure and being
(Continued)

generated based on the result of the verification by the auditing device, and validating the correctness information by the user device for proving retrievability of the stored information and the unpredictable random information.

11 Claims, 5 Drawing Sheets

(58) Field of Classification Search
CPC .......... G11B 7/125; G11B 19/04; G11B 7/00; G11B 7/004; G11B 20/1879
USPC ............. 726/1; 382/124; 713/176, 180, 172; 369/53.36, 116
See application file for complete search history.

(56) References Cited

U.S. PATENT DOCUMENTS

| | | | |
|---|---|---|---|
| 6,947,580 B1* | 9/2005 | Kinsella | G06F 3/03543 345/167 |
| 6,993,655 B1* | 1/2006 | Hecht | G06K 7/143 235/468 |
| 8,667,287 B2* | 3/2014 | Bichsel | G06F 21/33 705/50 |
| 8,706,701 B1 | 4/2014 | Stefanov et al. | |
| 2009/0171878 A1 | 7/2009 | Zeng | |
| 2014/0012899 A1* | 1/2014 | Baptist | G06F 17/30126 709/203 |

OTHER PUBLICATIONS

Joseph Bonneau et al: "Bitcoin as a public randomness source", Dec. 1, 2014 (Dec. 1, 2014), XP055211607, Retrieved from the Internet: URL:https://docs.google.com/presentation/d1VWHm4Moza2znhXSOJ8FacfNK2B_vxnfbdZgC5EpeXFE/view.

Frederik Armknecht et al: "Outsourced Proofs of Retrievability", Computer and Communications Security, ACM, 2 Penn Plaza, Suite 701 New York NY 10121-0701 USA, Nov. 3, 2014 (Nov. 3, 2014), pp. 831-843, XP058060660.

* cited by examiner

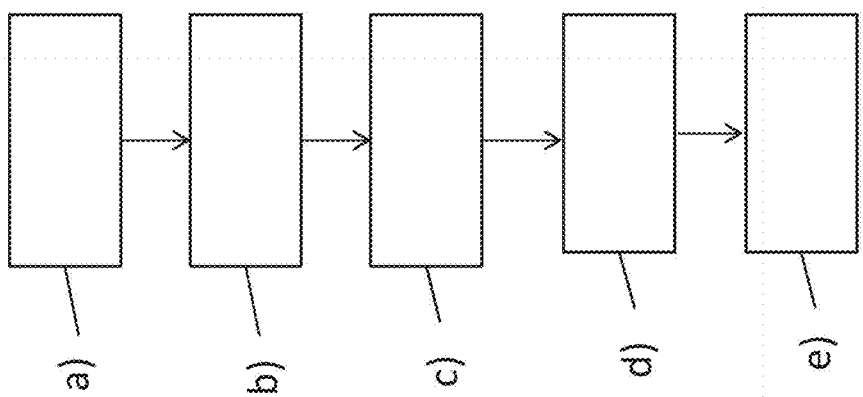

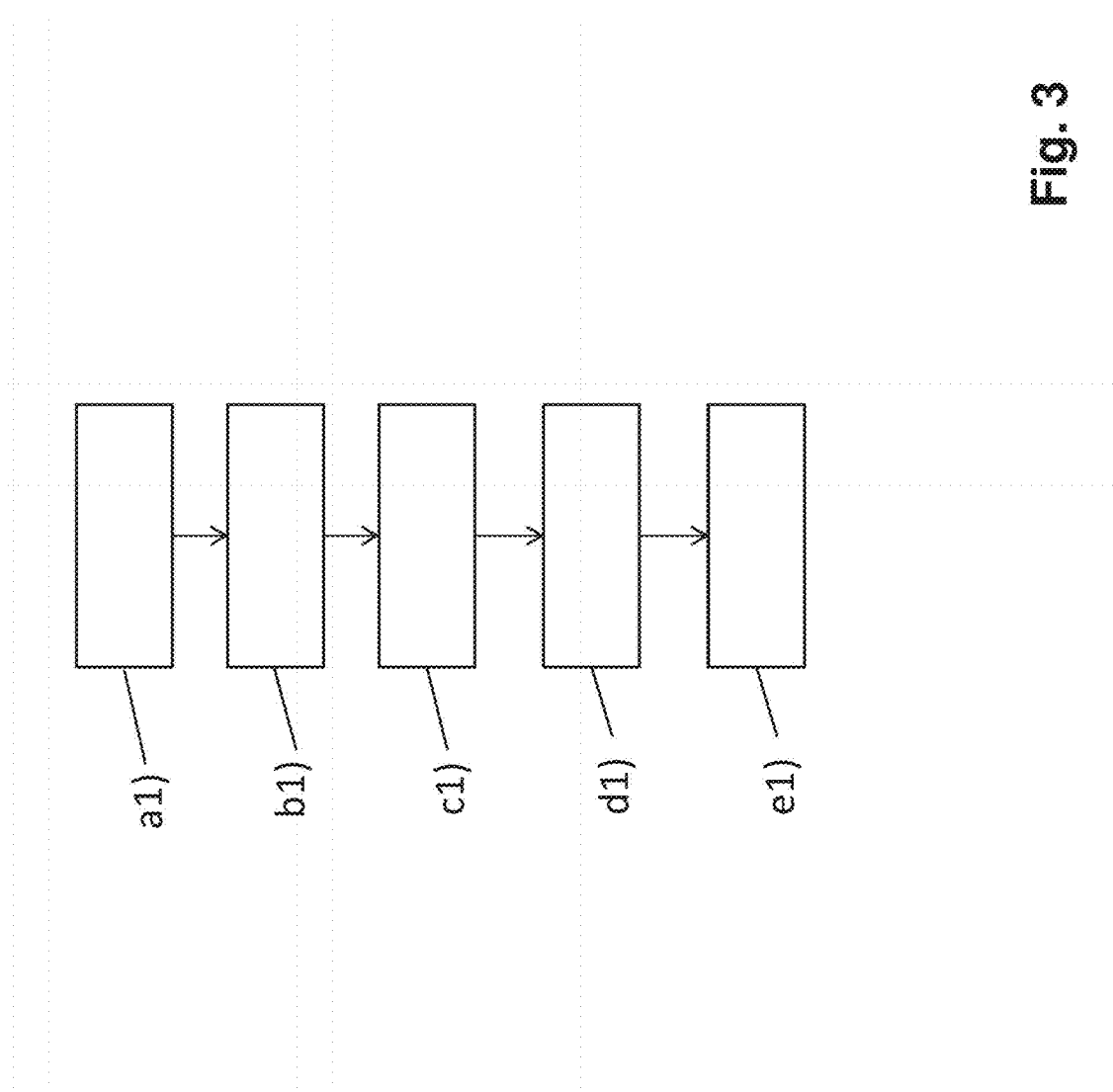

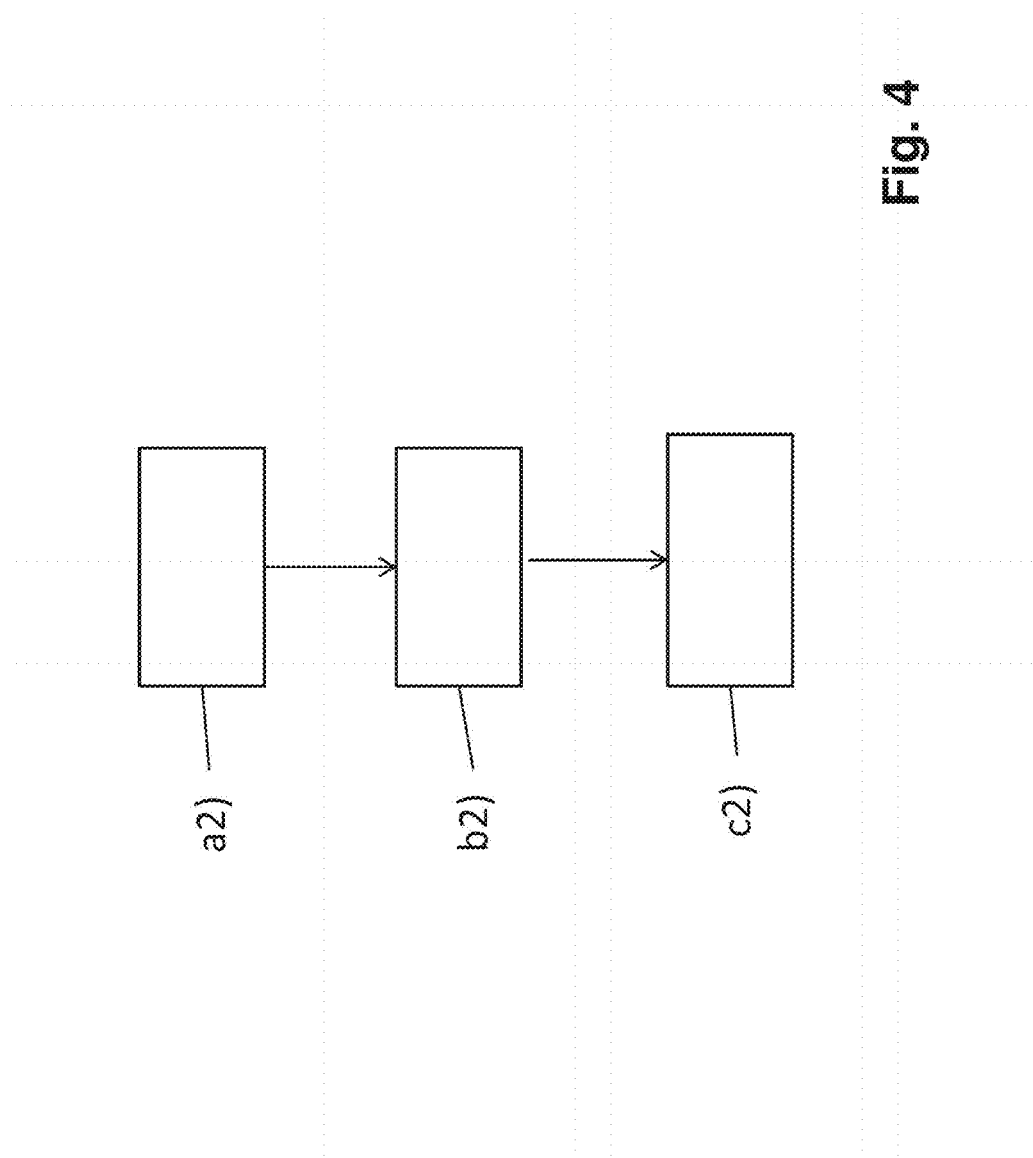

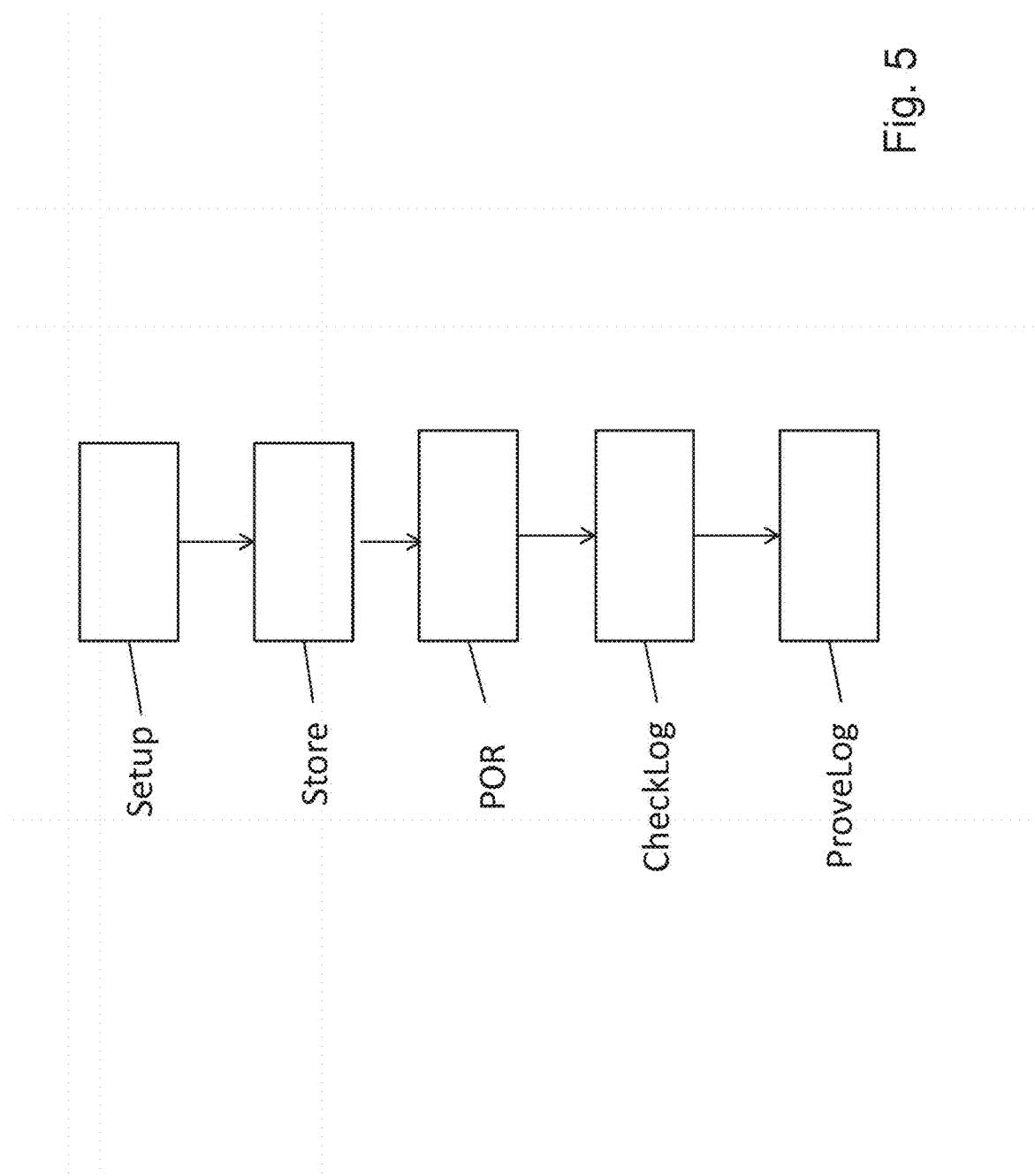

METHOD FOR PROVING RETRIEVABILITY OF INFORMATION

CROSS REFERENCE TO RELATED APPLICATIONS

This application is a U.S. National Stage Application under 35 U.S.C. § 371 of International Application No. PCT/EP2015/060917 filed on May 18, 2015, and claims benefit to European Patent Application No. 14168694.9 filed on May 16, 2014. The International Application was published in English on Nov. 19, 2015 as WO 2015/173434 A1 under PCT Article 21(2).

FIELD

The present invention relates to a method, performed in a memory available to one or more computation devices for proving retrievability (POR) of information, to a method, performed by a user device, for proving retrievability (POR) of information, and to a method, performed by an auditing device, for proving retrievability (POR) of information. The present invention further relates to a system for proving retrievability (POR) of information, said system comprising a user device, a storing device and an auditing device.

BACKGROUND

Cloud services are increasingly gaining importance and applicability in numerous application domains such as storage, computing services, collaboration platforms, etc. Clouds offer a huge economic benefit to companies, private individuals, and public organizations that deploy or provision cloud services in a cost effective manner. However cloud storage and computation services introduce new threads to data security. Customers of cloud services lose control over their data and how data is processed or stored. This makes users reluctant to use cloud services.

To address this problem, i.e. to enable users to verify the integrity and availability of their outsourced data, so-called proofs of retrievability as disclosed in the non patent literature (NAOR, M., AND ROTHBLUM, G. N. The Complexity of Online Memory Checking. In FOCS (2005), pp. 573-584), have been proposed. These proofs of retrievability (POR) provide end clients with the assurance that the data is still available and can be entirely downloaded if needed.

Conventional methods share a similar system and attacker model including a cloud user and a rational cloud provider. Here a "malicious" cloud aims at minimizing costs, for example by not deploying appropriate security measures in their datacenters or by intentionally modifying or for example deleting user data. The guarantees provided by the conventional methods and systems therefore largely depend on the users themselves who are required to regularly perform verification in order to react as early as possible in the event of data loss. Furthermore, said verification requires the user to be equipped with devices that have network access and that can tolerate computational overhead incurred by the verification process.

As a result, users must either accept this burden and regularly verify their outsourced data or entrust cloud providers to deploy necessary security mechanisms to ensure data integrity in spite of server failures exploits, etc. However, the latter option has the disadvantage of transferring costs to the cloud service providers.

SUMMARY

In an embodiment, the present invention provides a method for proving retrievability (POR) of information, the method being performed in a memory available to one or more computation devices, wherein credentials between a user device, a storing device and an auditing device between each pair of the devices are exchanged and used for communication between them. The method includes a) encoding, by the user device or the auditing device, information to be stored on the storing device; b) storing the encoded information on the storing device; c) verifying the correctness of the stored information by the auditing device using unpredictable random information; d) transmitting correctness information to the user device, the correctness information being secure and being generated based on the result of the verification by the auditing device; and e) validating the correctness information by the user device for proving retrievability of the stored information and the unpredictable random information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 shows a method according to an embodiment of the invention;

FIG. 3 shows a method according to a further embodiment of the present invention;

FIG. 4 shows a method according to a further embodiment of the present invention; and FIG. 5 shows steps of a method according to a further embodiment of the present invention.

DETAILED DESCRIPTION

Figure 1:
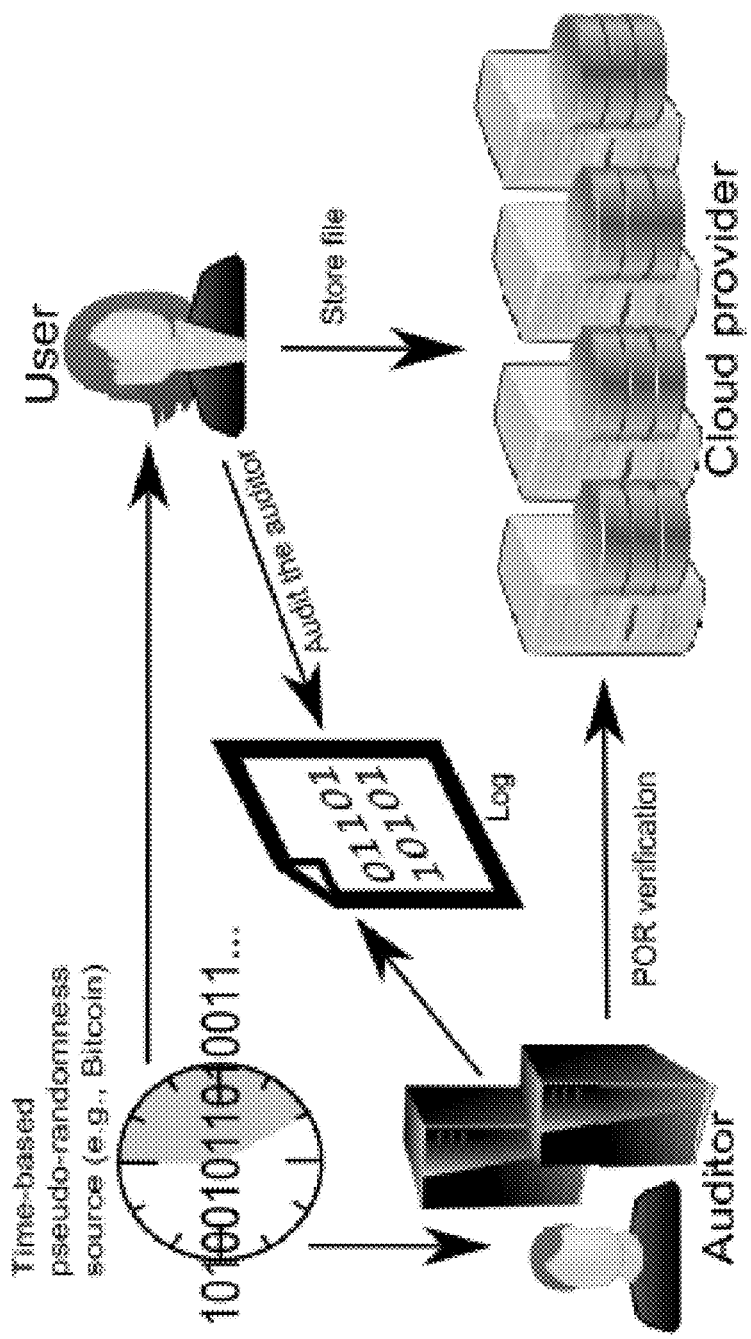
FIG. 1 shows a method according to an embodiment of the invention.

Although applicable in general to any kind of storage devices, the present invention will described with regard to cloud storage devices.

Embodiments of the present invention provide a method and system for proving retrievability of information which are flexible while remaining secure and computationally efficient. Embodiments of the present invention further provide a method and a system for proving retrievability of information that are easy to implement.

In an embodiment, the invention provides a method, performed in a memory available to one or more computation devices, for proving retrievability (POR) of information, wherein credentials between a user device, a storing device and an auditing device between each pair of said devices are exchanged and used for communication between them. The method includes the steps of a) encoding the information to be stored on said storing device by said user device or said auditing device, b) storing the encoded information on said storing device, c) verifying the correctness of said stored information by the auditing device using unpredictable random information, d) transmitting correctness information to the user device, said correctness information being secure and which are generated based on the result of said verification by the auditing device, and e) validating said correctness information and said unpredictable random information by the user device for proving retrievability of said stored information. Step e) may be performed at any time, not necessarily synchronized with the process or procedure of the auditing device.

In a further embodiment, the invention provides a system for proving retrievability (POR) of information, said system comprising a user device, a storing device, and an auditing device, wherein credentials between said user device, said storing device and said auditing device between each pair of said devices are exchanged and used for communication between them, said user device or said auditing device being adapted to encode the information to be stored on said storing device, and said user device being adapted to validate correctness information for proving retrievability of said stored information using unpredictable random information, said storing device being adapted to store the encoded information, said auditing device being adapted to verify the correctness of said stored information using said unpredictable random information, and to transmit correctness information to the user device, said correctness information being secure and which are generated based on the result of said verification by the auditing device.

In a further embodiment the present invention provides a method, performed by a user device, for proving retrievability (POR) of information comprising the steps of a1) exchanging credentials with a storing device and an auditing device to be used for communication between them, b1) preferably encoding the information to be stored on said storing device, c1) initiating of storing the encoded information on said storing device, d1) receiving correctness information, wherein said correctness information being secure and which are generated based on the result of said verification and e1) validating said correctness information for proving retrievability of said stored information and the unpredictable random information. Step e1) may be performed at any time, not necessarily synchronized with the process or procedure of the auditing device.

In a further embodiment the present invention provides a method, performed by an auditing device for proving retrievability (POR) of information, comprising the steps of a2) exchanging credentials with a storing device and a user device to be used for communication between them, b2) verifying the correctness of stored information using unpredictable random information, and c2) transmitting correctness information to said user device, said correctness information being secure and generated based on the result of said verification.

At least one embodiment of the invention has the advantage of a high security protecting against any combination of colluding malicious parties providing stronger guarantees in security compared to conventional methods and systems.

At least one embodiment has the advantage that users have the guarantee that the data is entirely stored for example in the cloud without having to verify their data themselves.

At least one embodiment has the advantage that although auditors are made liable to monitor the availability of their files users can verify the auditors work at any point in time. This verification can be much less frequent and is therefore considerably more computational efficient when compared to conventional verification methods and systems.

At least one embodiment has the further advantage of being technically and economically viable. By providing necessary security guarantees for the auditors, auditors are enabled to issue a security service level agreement for cloud users attesting that they will correctly verify the availability of outsourced data.

At least one embodiment has the advantage of an enhanced flexibility: While main barriers of wide adoption of cloud services lie in the lack of customer trust and in the high costs of deploying security measures for example in cloud infrastructures, these gaps are now bridged and customers and external auditors are enabled to, e.g., establish a financial contract by which customers can rest assured that the security of their files is constantly monitored. For instance at least one embodiment also deters against malicious users, auditors can issue security service level agreements for cloud users in exchange, for example by offering financial remuneration.

At least one embodiment has the advantage that it can be easily integrated: For example it can be directly integrated with any cloud storage platform providing support for conventional proof of retrievabilities, for example for a cloud provider providing raw storage and computing services.

A user device may be any kind of computing entity or application running on a computing entity being adapted to perform corresponding steps, procedures or the like and may include, but is not limited to, a personal computer, a tablet PC, a cell phone, a micro processor, a memory attached to the micro processor, any application running or one or more processors having one or more cores, a cloud computing platform or the like.

A storing device may be any kind of computing entity or application running on a computing entity being adapted to perform corresponding steps, procedures or the like and may include, but is not limited to, a personal computer, a tablet PC, a cell phone, a micro processor, a memory attached to the micro processor, any application running or one or more processors having one or more cores, a cloud computing platform or the like.

An auditing device may be any kind of computing entity or application running on a computing entity being adapted to perform corresponding steps, procedures or the like and may include, but is not limited to, a personal computer, a tablet PC, a cell phone, a micro processor, a memory attached to the micro processor, any application running or one or more processors having one or more cores, a cloud computing platform or the like.

An auditing device may be provided with contract information by the user device, said contract information specifying a checking policy for the auditing device and/or the information to be proved for retrievability. This enables to provide the auditing device with precise information about the information to be checked, for example including the information which file should be regularly checked and parameters necessary for said checking of the information.

Stored information may be different from said information to be stored, wherein said information to be stored is recoverable from said stored information. For instance this enables that the file stored may be not exactly equal to the file to be stored. However the original file dedicated for storing must be recoverably from the stored file. This enhances the flexibility since for instance the file can be compressed or the like for storing.

An information dispersal procedure may be applied to the information to be stored prior to storing. An information dispersal procedure may for example be a forward error correction procedure, an erasure code or the like. When such a forward error correction is applied then errors in the data transmission can be controlled and thus reliability in terms of correctly transmitting the file for storing is enhanced.

The source for unpredictable random information may commonly used by the user device and the auditing device.

This enables a verifier, for example the auditing device and a user to commonly extract unpredictable information when relying on the same source of unpredictable randomness without the need for interaction between the user device and the auditing device. The source may be based on Bitcoin. This enables to use a public available source of unpredictable randomness which is easily available and which can easily be used to construct commitment schemes.

Correctness information may be based on information of an external mutually trusted entity. For example said information may be a root certificate of a certification authority. This enables in an easy way to verify the correctness of said stored information and the auditing device can convince the user device that he correctly verified said stored information. Said correctness information may be provided in form of a log-file by the auditing device. This enables in an easy way to provide correctness information.

Step c) and/or step e) may be based on a proof-of-retrievability-protocol. The auditing device may perform a proof-of-retrievability-protocol with said storing device and the user device may audit the auditing device using a proof-of-retrievability protocol. For example when said proof-of-retrievability-protocol is used for step c) and for step e) an enhanced security and an auditing of the auditing device is enabled: By requiring the auditing device to conduct a proof-of-retrievability in parallel with the storing entity a first proof-of-retrievability can be verified by the auditor himself and a second one which can optionally be verified by the user having the right cryptographic key. Upon completion of each proof-of-retrievability the auditing device logs the responses of the storing entity and parameters being used to conduct the two proof-of-retrievability protocols, for example block indices used at a challenge or the like. The second proof-of-retrievability protects on the one hand against malicious auditors or storing providers and enables auditing the auditing device. The user device is enabled to efficiently verify in a single batch a number of conducted proof-of-retrievabilities to verify the work of the auditing device. This minimizes communication overhead while achieving the same level of security and efficiency as conventional methods and systems.

Contract information may include at least one of the following: Maximum interval within which the auditing device notifies the user device of an at least partial loss of said stored information, maximum failure tolerance. This enables in an easy way to instruct the auditing device for monitoring stored information on the storing device.

FIG. 1 shows a method according to an embodiment of the invention. The method of FIG. 1 resists a malicious auditor and a malicious user and enables a user to efficiently audit the auditor at any point in time. The method of FIG. 1 leverages functionality from Bitcoin in order to provide a time-based source of pseudo-randomness to sample parameters of the proof-of-retrievability.

The method of FIG. 1 builds upon the private-key unbounded POR scheme that is called PSWPOR here which minimizes bandwidth overhand, and maximizes performance/scalability. To achieve an outsourced POR (OPOR) the auditor may instantiate all protocol parameters, e.g., secret keys, verification tags, etc., and conduct the PSWPOR regularly with the service provider. However in the presence of a malicious service provider, this would inherit the same security guarantees as already proven for PSWPOR. However, this does not protect against a malicious user, and/or a malicious auditor.

In fact, to provide a secure OPOR, a number of challenges need to be addressed:

Malicious Auditor: Conventional POR rely on the assumption that the verifier is honest. As such, these PORs cannot be directly used to setup an OPOR, where the auditor might deviate from the protocol, and/or collude with the service provider. For example, a malicious auditor may share the secret key with the service provider so that both can produce correct PORs without having to store the file at all.

Auditing the Auditor: This suggests that—although users should not be involved in verifying the retrievability of their files—OPOR should enable users to audit the auditors. Clearly, for an OPOR scheme to be effective, such an audit should be much less frequent and considerably more efficient than the act of verifying the files stored at a cloud for instance. However, verifying the POR response typically requires the knowledge of the secret key; if this key would be known to the user, a malicious user could reveal this key to a malicious service provider. Hence, one requires that the auditor can be audited to some extent—without revealing his secret keys.

Auditor Liability: This has a further consequence. Since the auditors want to minimize their liability, an OPOR scheme should (i) protect the auditors from malicious users, and (ii) enable auditors to attest to any party that they did their work correctly, in case of dispute or litigation. This entire process should be efficient, and should scale with the number of the auditor customers.

Parameter Generation: A POR depends on several parameters. To achieve auditor liability, an auditor needs to be able to convincingly prove later on that these parameters have been constructed correctly—even if the file is no longer present.

Challenge Sampling: In the second phase of a POR, the verifier is typically required to construct a number of challenges, which correspond to randomly samples field elements, e.g., as in PSWPOR). Clearly, these challenges cannot depend on any of the involved three parties (the cloud, the user, and the auditor) since they might be malicious; interactive sampling among two parties does not solve this problem, since any two parties might collude, and would require user interaction. This problem is further exacerbated by the fact that the challenges cannot be pre-defined, e.g., by agreeing some seed of a pseudo-random bit generator since a malicious auditor might pre-share all the block indices to be queried with a malicious provider; the latter can then compute the necessary replies to those challenges and delete the file, while answering correctly to all POR.

According to the embodiment in the method of FIG. 1, the first two challenges are overcome by requiring the auditor to conduct two PORs in parallel with the service provider: one POR which can be verified by the auditor himself, and another one which can optionally be verified by the user (who has the right cryptographic keys). Upon the completion of each POR, the auditor logs the responses of the service provider, and the parameters used to conduct the two PORs (e.g., block indices used at challenge). This second POR protects on the one hand against malicious auditor/service provider and allows for auditing the auditor. Here, the method of FIG. 1 enables the user to efficiently verify in a single batch a number of conducted POR to verify the work of the auditor. This minimizes communication overhead while achieving the same level of security and efficiency as in PSWPOR.

The method of FIG. 1 only incurs negligible overhead on the auditor, and scales well with the number of clients. However, an auditor could still cheat in principle, e.g., by using wrong parameters or by biasing the challenge sampling process according to some strategy. To ensure correct parameter generation, the method of FIG. 1 relies on a sub-protocol which guarantees that the parameters computed by the auditor in the beginning have been correctly generated without revealing his secret parameters. Secondly, to ensure a truly (pseudo-)random sampling of the challenges, the method of FIG. 1 exploits the fact that any randomized algorithm can be rewritten as a deterministic algorithm where the random bits are provided as additional input.

The idea is now to remove from the auditor the means to sample these random bits but to extract them from an external source. To this end, the method of FIG. 1 leverages functionality from Bitcoin in order to provide a time-based source of pseudo-randomness to sample the parameters of the POR. An important property is that in case of potential conflicts, e.g., if the file gets lost, the auditor can provide an irrefutable cryptographic proof that he correctly followed the protocol. This can be achieved by opening the auditor's key for which a commitment has been signed in the beginning, i.e., during the Store protocol. Owing to the fact that any random bits extracted from Bitcoin can be uniquely reconstructed at any later point in time, the whole POR can be re-played to check if (i) the auditor did send the correct challenges and (ii) the response sent by the service provider has been correct.

In the following paragraphs a concrete instantiation of an OPOR is described. The building blocks that are used in the method of FIG. 1 are the following:

Unless otherwise specified, all operations in the method of FIG. 1 are performed in the finite field $F=Z_p$. The method of FIG. 1 makes use of a number of established cryptographic building blocks: a pseudo-random function $f: \{0, 1\}^* \times \{0, 1\}^{l_{PRF}} \rightarrow F$, a cryptographic hash function H, a signature scheme (KeyGen, Sign, Verify), and a pseudo-random bit generator:

$$g: \{0,1\}^{l_{seed}} \times \{0,1\}^{l_{prbg}} \rightarrow \{0,1\}^*$$

Here, the output of the PRBG is assumed to be long enough to extract the required number of pseudo-random bits. The bit length of p, $l_{PRF}$, $l_{seed}$ are all chosen equal to the intended security level.

In addition, the method of FIG. 1 leverages a time-based pseudo-randomness generator:

$$\text{GetRandomness}: \Gamma \rightarrow \{0,1\}^{l_{seed}}.$$

GetRandomness has access to a secure time-dependent source. Let cur denote the current time. On input, $t \in \Gamma$, with $\Gamma$ being a time set, GetRandomness outputs a uniformly random string in $\{0, 1\}^{l_{seed}}$ if $t \geq cur$, otherwise GetRandomness outputs $\perp$. GetRandomness is secure, if the output of GetRandomness(t) cannot be predicted with non-negligible probability as long as t<cur.

In the method of FIG. 1, GetRandomness is elected to be instantiated by leveraging functionality from Bitcoin, since the latter offers a secure and convenient way (e.g., by means of API) to acquire time-based pseudo-randomness. Bitcoin as shown in the non patent literature (BONEH, D., LYNN, B., and SHACHAM, H. Short signatures from the weil pairing. J. Cryptology 17, 4 (2004), 297-319) relies on blocks, a hash-based Proof of Work (PoW) concept, to ensure the security of transactions. In particular, given the set of transactions that have been announced since the last block's generation, and the hash of the last block, Bitcoin miners need to find a nonce, that would make the hash of the formed block smaller than a 256-bit number target:

$$\text{hash}\{Bl\|MR(TR_1, \ldots, TR_n)\|\text{nonce}\} \leq \text{target},$$

where Bl denotes the hash of last generated block, MR(x) denotes the root of the Merkle tree with elements x. $TR_1\|\ldots\|TR_n$ is a set of transactions that have been chosen by the miners to be included in the block.

The difficulty of block generation in Bitcoin is adjusted so that blocks are generated once every 10 minutes on average; it was shown in the non patent literature (see PETERSON, Z. N. J., GONDREE, M. and BEVERLY, R. A. position paper on data sovereignty; The importance of geolocating data in the cloud. In Proceedings of the $3^{rd}$ USENIX Conference on Hot Topics in Cloud Computing (Berkeley, Calif., USA, 2011), Hot Cloud'11, USENIX Association, pp. 9-9), that the block generation in Bitcoin follows a shifted geometric distribution with parameter p=0.19.

Given this, GetRandomness then unfolds as follows. On input time t, GetRandomness outputs the hash of the latest block that has appeared since time t in the Bitcoin block chain. Clearly, if t is in the future, then GetRandomness will output $\perp$, since the hash of a Bitcoin block that would appear in the future cannot be predicted. On the other hand, it is straightforward to compute of GetRandomness t, for a past time t, by fetching the hash of previous Bitcoin blocks. The specifications for the four protocols, i.e. Setup, Store, POR, and CheckLog, in the method of FIG. 1 are described in detail herein below.

Specification of the Setup Protocol

Each party $a \in \{U, A, S\}$ runs the key generation algorithm KeyGen of the digital signature scheme to receive a secret signing key $sk_a$ and a public verification key $pk_a$. The public keys are distributed amongst all parties.

Specification of the Store Protocol

This Store protocol is initiated by the user U, holding a file $M_f$. First, the user executes an information dispersal algorithm (i.e., erasure code) to disperse $M_f$ into n blocks (for a given n, and a reconstruction threshold), each s sectors longs: $\{M_{ij}\}_{1 \leq i \leq n,\ 1 \leq j \leq s}$. The resulting file M will be the actual input to the interactive Store protocol. For communication links, it is assume that they are authenticated, which can be realized by means of the TLS protocol as public/private key pairs are established.

User-controlled parameters: The user samples the values that are necessary for verifying a POR as mandated by the private scheme described in the Shacham and Waters scheme (SW scheme). More precisely, a key is sampled for the PRF $k_{prf} \xleftarrow{R} \{0, 1\}^{l_{PRF}}$ and s elements of the finite field, i.e., $\alpha_1, \ldots, \alpha_s \xleftarrow{R} F$. Finally, the user computes for each $i, 1 \leq i \leq n$:

$$\sigma_i \leftarrow f_{k_{prf}}(i) + \sum_{j=1}^{s} \alpha_j M_{ij} \in F.$$

The user sets $vk:=(k_{prf}, \alpha_1, \ldots, \alpha_s)$ and keeps it secret. The processed file is denoted with $M^*:=(\{M_{ij}\}, \{\sigma_i\}_{1 \leq i \leq n})$ The file $M^*$ is uploaded to the server S.

Auditor-controlled parameters: The auditor A also samples secret values to verify a POR in the private SW scheme. That is, he samples a key for the PRF $k'_{prf} \xleftarrow{R} \{0, 1\}^{l_{PRF}}$ and s elements of the finite field, i.e., $\alpha_1', \ldots, \alpha_s' \xleftarrow{R} F$. Then, the file $M^{*'}$ will be fetched by the auditor from the service provider S. In a practical instantiation it is assumed that the auditor has read access rights over M* which is stored at the cloud. If everyone follows the protocol and no errors occur, it holds M*'=M*. Finally, the auditor computes for each i, 1≤i≤n:

$$\sigma'_i \leftarrow f_{k'_{prf}}(i) + \sum_{j=1}^{s} \alpha'_j M'_{ij} \in \mathbb{F}.$$

The auditor uploads the values $\{\sigma_i'\}_{1 \leq i \leq n}$ and $\{\sigma_i\}_{1 \leq i \leq n}$ to the provider, and sends them also to the user together with a correctness proof. The auditor sets $\tau:=(k'_{prf}, \alpha_1', \ldots, \alpha_s')$ and keeps it secret.

Proving correctness of $\sigma_i'$; The auditor needs now to convince the user that he correctly computed $\sigma_i'$. Therefore, user and auditor choose an RSA modulus N. The auditor should not know the factorisation to ensure that he cannot compute the inverse modulo $\Phi(N)$. Similarly, the user must not be able to compute discrete logarithms in this group. The user and auditor are elected to agree on an external mutually trusted number N, e.g., the value N of the root certificate of a certification authority. Then, both entities pick a generator $g<N$ in $Z_N$, whose order is unknown (at least) to the auditor.

The auditor commits to the secret values $\alpha_i'$ as well as to the pseudo-random values used in computing $\sigma_i'$. In particular, A computes the following commitments:

$$g_1 = g^{\alpha'_1} \bmod N, \ldots, g_s = g^{\alpha'_s} \bmod N$$

$$h_1 = g^{f_{k'_{prf}}(1)} \bmod N, \ldots, h_n := g^{f_{k'_{prf}}(n)} \bmod N.$$

As the values $\sigma_i'$ were computed in F, i.e. mod p, the auditor A computes for $i \in \{1, \ldots, n\}$ over the integers Z:

$$\sigma'^{\mathbb{Z}}_i \leftarrow f_{k'_{prf}}(i) + \sum_{j=1}^{s} \alpha'_j M'_{ij} (\in \mathbb{Z})$$

and determines by means of integer division the values $q_i$ with $\sigma_i' = \sigma'^{\mathbb{Z}}_i - q_i \cdot p$, where p is the prime used for the finite field $F=Z_p$. The auditor also computes commitments $g^{q_i}$ and sends all commitments to the user U.

Next, the user and the auditor executes a zero-knowledge-proof, 'ZKP', whose purpose is to show that the auditor indeed knows the discrete logarithms of the values $g_j$, $h_j$ and $q_i$. For this purpose, The method of FIG. 1 leverages a non-interactive Schnorr ZKP protocol as disclosed in the non patent literature of WATSON, G. J., SAFAVI-NAINI, R., ALIMOMENI, M. LOCASTO, M. E., and NARAYAN, S. Lost: location based storage. In CCSW (2012), T. Yu, S. Capkun and S. Kamara. Eds., ACM, pp. 59-70. Here, to verify the knowledge, e.g., of $\alpha_i'$, the auditor chooses a random value $r_i \in Z$, computes $c_i = g^{r_i} \bmod N$, and $d_i = r_i + c_i \cdot \alpha_i'$. Values $\{c_i, d_i\}$, •i are then sent to the user, who verifies $g^{d_i} = g^{r_i} \cdot (g_1)^{c_i} \bmod N$. Here r is sampled as a 240-bit random number.

U can now use all received commitments to check whether:

$$g^{\sigma'_i} \stackrel{?}{=} h_i * \prod_{j=1 \ldots s} g_j^{M_{ij}} / (g^{q_i})^p \text{ for } i \in \{1, \ldots, n\}.$$

If all verifications return true, U then signs the commitments and sends his signature to A who inserts the commitments and the user's signature into the log file Λ.

Agreements: Besides the agreement on the values $\sigma_i'$, the method of FIG. 1 may use additional agreements between the user and the auditor, e.g.:

All parties need to agree on the file that is stored. The provider will sign H(M*) once uploaded by the user and send the signature to the user to confirm reception of the file. The user forwards the receipt to the auditor, who will download the respective file and verify the H and the signature. Additionally, the auditor signs H(M*) and sends the signature to the user. The user verifies the signature and compares with H(M*). If any verification fails, user or auditor abort the protocol.

User and auditor need to further agree on the conditions of their contract. The user and the auditor are assumed to agree on the latest block Bl which has appeared in the Bitcoin block chain, and an interval d, which dictates the frequency at which the auditor performs the POR. User and auditor also agree on the sample sizes lU and lS to be checked in the PORs. The user then requires the auditor to perform a POR with the cloud provider whenever d new Bitcoin blocks appear in the Bitcoin chain. In case of block forks as disclosed in the non patent literature of BONEH, D., LYNN, B. AND SHACHAM, H, Short signatures from the weil pairing, J. Cryptology 17, 4 (2004), 297-319, an auditor can make use of hashes of one of the block forks that appear at the same height in the block chain. This approximately corresponds to conducting a POR every 10d minutes starting from block Bl which marks the setup time. The auditor and user sign H (Bl, d, $1_U$, $1_A$) and store it together with the signed file as confirmation of the contract.

Specification of the Por Protocol

Our POR protocol corresponds to two parallel executions of the private POR. Similar to the PSWPOR, the auditor starts by generating two random POR challenges of size $l \in \{1_A, 1_U\}$ for the two POR schemes established in said Store procedure or protocol. To generate a challenge of length l, the verifier picks a random l-element subset I of the set $\{1, \ldots, n\}$, and for each $i \in I$, a random element $v_i \stackrel{\$}{\in} F$. The output of this procedure, denoted by Sample(l), is the set $\{(i, v_i)\}_{i \in I}$ of size l. Any probabilistic algorithm can be considered as a deterministic algorithm if the internal random coins θ are specified as input, i.e., Sample(θ, l). The random coins θ are not sampled by the user and/or auditor, but are determined from the pseudo-random number generator g that is initialized with the seed obtained from GetRandomness(t) for the current time t.

The auditor A chooses an input $x \in \Gamma$ and invokes GetRandomness to get some seed $y \in \{0, 1\}^{lseed}$. Then, the pseudo random bitcoin generator PRBG is invoked on the seed y to get sufficient random bits θ for use in the two algorithms Sample(θ, $1_{auditor}$) and Sample(θ, $1_{user}$) to obtain the challenge sets $Q_A$ and $Q_U$. These challenges are sent to the provider who has to respond with two PORs: one based on the values $\sigma_i$ that have been provided by the user and one using the auditor's $\sigma_i'$ values. The provider now behaves exactly as in the SW scheme and computes:

for $\overline{Q} \in \{Q_A, Q_U\}$ and $1 \leq j \leq s$

-continued $$\mu_j \leftarrow \sum_{(i,v_i)\in Q} v_i M_{ij} \in \mathbb{F},$$

$$\mu'_j \leftarrow \sum_{(i,v_i)\in Q} v_i M_{ij} \in \mathbb{F},$$

$$\sigma \leftarrow \sum_{(i,v_i)\in Q} v_i \sigma_i \in \mathbb{F},$$

$$\sigma' \leftarrow \sum_{(i,v_i)\in Q} v_i \sigma'_i \in \mathbb{F},$$

Finally, the service provider sends to the auditor the two responses $\rho:=(\mu_1, \ldots, \mu_s, \sigma)$ and $\rho':=(\mu_1', \ldots, \mu_s', \sigma')$. Both responses $\rho$ and $\rho'$ are signed by S to offer non-repudiation. The auditor checks the signature of $\rho$ and $\rho'$. However the auditor can only verify the latter POR response using $\tau$ by $$\sigma' \stackrel{?}{=} \sum_{(i,v_i)\in Q_A} v_i f_{k'_{prf}}(i) + \sum_{j=1}^{s} \alpha'_j \mu'_j.$$

If this POR does not verify, the auditor informs the user according to the contract about problems with the storage of M*. The auditor finally creates the log entry comprising of the following information:

$Bl_t,\text{GetRandomness}(Bl_t),\rho,\text{Sig}_s(\rho),\rho'\text{Sig}_s(\rho')$.

Specification of the Checklog Protocol

First it is described how a single entry in log file can be verified. First, the user checks the syntax and verifies the signature of S on the values $\rho$ and $\rho'$. Then, the user determines $Q_U$ as described in the POR protocol using Sample($\theta$, $1_{user}$) with pseudo-random coins $\theta$ obtained with $Bl_t$. Afterwards, the correctness of $\rho$ is checked, given $Q_U$ and $\rho=(\mu_1, \ldots, \mu_s, \sigma)$ analogous to the verification of $\rho'$ by the auditor in the POR protocol. The user cannot verify $\rho'$ without $\tau$; this stronger verification of $\rho'$ can only be performed in a "forensic" analysis with the protocol ProveLog.

As a minimal check, the user can check the last entry since this reflects the most recent state of retrievability for the file or a subset of entries. In the method of FIG. 1 the user has the possibility to request a batch of log entries from the auditor. U selects a random subset B of indices and sends them to the auditor. The auditor A responds with the corresponding log entries $\{Bl_b, \rho_b, \text{Sigs}(\rho_b)\}_{b\in B}$ to the user. The user proceeds with checking the received log file entries. If any of the user's checks fails, the user will assume that either A or S is malicious and takes actions such as attempting to download the file or starting an analysis with ProveLog.

Specification of the Provelog Protocol

The ProveLog algorithm provides stronger means for analyzing the correct behavior of the auditor when compared to CheckLog. ProveLog requires that the auditor must reveal his secret token $\tau$ and open the log $\Lambda$. In addition to the verifications in the CheckLog protocol, every server response $\rho'$ to the auditor will be verified in ProveLog using $\tau$. Additionally, the correctness of $\tau$ will be verified, by recomputing commitments and verifying the user's signature generated in the Store protocol during the verification of the auditor's $\sigma_i$ values. If all verifications pass, the auditor can prove that it has executed all protocols correctly.

FIG. 2 shows a method according to a further embodiment of the present invention. In FIG. 2 a method for proving retrievability (POR) of information, said method being performed in a memory available to one or more computation devices, wherein credentials between a user device, a storing device and an auditing device between each pair of said devices are exchanged and used for communication between them. The method comprises the steps of a) encoding the information to be stored on said storing device by said user device or said auditing device, b) storing the encoded information on said storing device, c) verifying the correctness of said stored information by the auditing device, using unpredictable random information, d) transmitting correctness information to the user device, said correctness information being secure and which are generated based on the result of said verification by the auditing device, and e) validating said correctness information and unpredictable random information by the user device for proving retrievability of said stored information.

FIG. 3 shows an embodiment according to a further embodiment of the present invention. In FIG. 3 a method, performed by a user device, for proving retrievability (POR) of information is shown. The method comprises the steps of a1) exchanging credentials with a storing device and an auditing device to be used for communication between them, b1) encoding the information to be stored on said storing device, c1) initiating of storing the encoded information on said storing device, d1) receiving correctness information, wherein said correctness information being secure and which are generated based on the result of said verification and e1) validating said correctness information and unpredictable random information for proving retrievability of said stored information.

FIG. 4 shows a method according to a further embodiment of the present invention. In FIG. 4 a method, performed by an auditing device for proving retrievability (POR) of information is shown. The method comprises the steps of a2) exchanging credentials with a storing device and a user device to be used for communication between them, b2) verifying the correctness of stored information using unpredictable random information, and c2) transmitting correctness information to said user device, said correctness information being secure and which are generated based on the result of said verification.

FIG. 5 shows steps of a method according to a further embodiment. In FIG. 5 a so-called outsourced proof of retrievability (OPOR) and its steps are shown. This OPOR comprises of a user U, the data owner, who plans to outsource his data M to a service provider S. In addition, U is interested in acquiring regular proofs that his data is still correctly stored and retrievable from S. To this end, an OPOR comprises a new entity A, called the auditor, who runs PORs with S on behalf of U. If these POR do not succeed, the auditor may take certain actions, e.g., inform the user immediately. Otherwise, the user is assured that the data are stored correctly. More specifically, an OPOR scheme comprises five protocols or procedures Setup, Store, POR, CheckLog, and ProveLog. The first three protocols are based on protocols that are represented in a POR scheme but extend them. One major difference is that the POR protocol no only outputs a decision on whether the POR has been correct, but also a log file. The log files serve a twofold purpose. First, they allow the user to check—using the CheckLog procedure—if the auditor did his job during the runtime of the OPOR scheme. As the purpose of OPOR is to incur less burden on the user, the verification of the logs by the user should incur less resource consumption on the user when compared to the standard verification of POR directly with S. Second, logs allow the auditor to prove—using the ProveLog procedure—that if some problems occur, e.g., the file is no longer stored by S, the auditor must not be blamed. In the following, each protocol in OPOR is described in more detail.

Setup Step

This randomized protocol generates for each of the different parties a public-private key pair. If a party only deploys symmetric key schemes, the public key is simply $\perp$. For the sake of brevity, it is implicitly assumed for each of the subsequent protocols and procedures that an involved party always uses as inputs its own secret key and the public keys of the other parties.

Store Step

This randomized file-storing protocol takes the secret keys of the parties and a file M from the user to be stored. The output M* for the service provider marks the data that it should store. The user also needs to specify a contract c specifying the policy for checks for the auditor. M* may not be exactly equal to M, but it must be guaranteed that M can be recovered from M*. Additionally, the output needs to contain information (i) which enables the execution of a POR between A and S on the one hand and (ii) which enables the validation of the log files created by A on the other hand. These are represented by $\tau$ and vk, respectively. An important distinction from PORs comes from the fact that when uploading a file M to the S which should be monitored by A, several agreements need to be established. Agree[$P_1$, $P_2$, [D]] denotes a file that proves that both parties $P_1$ and $P_2$ agreed on a file D. This does not require that D is given in clear within the agreement. For example, an agreement could be the signed hash of D: Most important, user U and auditor A need to agree which file M* will be monitored. In addition user and auditor need to agree on the contract c that sets a maximum interval within which the auditor needs to notify him in case M* is at least partially lost and a maximum failure tolerance. From this, the auditor will derive frequency and complexity of his PORs. Formally, it holds $$\text{Store:}[\mathcal{U}:M,c;\mathcal{A}:\perp;\mathcal{S}:\perp] \to [\mathcal{U}/:vk,$$
$$\text{Agree}(\mathcal{U},\mathcal{A},[M^*,vk,\tau,c]),\text{Agree}(\mathcal{U},\mathcal{S},[M^*]);$$

$$\mathcal{A}:\tau,\text{Agree}(\mathcal{U},\mathcal{A},[M^*,vk,\tau,c]),\text{Agree}(\mathcal{A},\mathcal{S},[M^*]);$$

$$\mathcal{S}:M^*,\text{Agree}(\mathcal{A},\mathcal{S},[M^*])]$$

The protocol run is accepted by the parties, if the agreements succeed.

POR Step

In the embodiment of OPOR, the auditor A and the provider S run a POR protocol to convince the auditor that M* is still retrievable from S. The input of A is the tag $\tau$ given by Store, the input of the provider S is the stored copy of the file M*. Like in the conventional POR model, on the auditor's side who plays the role of the verifier, the output contains one binary value $dec_A$ which expresses whether the auditor accepts the POR or not. In addition, the POR protocol taking place at a time t will produce an entry $\Lambda=(t, \log_t)$ that will be appended to the log file by A. It holds therefore for a protocol run at time t that:

$$POR:[\mathcal{A}:\tau;\mathcal{S}:M^*] \to [\mathcal{A}:\Lambda,dec^{\mathcal{A}}]$$

The protocol run is accepted by the auditor if $dec_A$=TRUE.

Checklog Step

In an embodiment of OPOR, the POR protocol only convinces A that M* is still retrievable. The CheckLog protocol takes the job to transfer trust to U. The user U uses the protocol to audit the auditor. Thus, CheckLog is a deterministic procedure which takes as input the verification key vk and a log file $\Lambda=(t, \log_t)$ and outputs a binary variable $dec_\Lambda$ which is either TRUE or FALSE, indicating whether the log file is correct. Formally:

$$dec_\Lambda=\text{CheckLog}(vk,\Lambda)$$

Provelog Step

ProveLog is a deterministic algorithm which will solve conflicts after the file M* is lost, i.e., one party aborted. In fact, if the CheckLog algorithm provides certainty about the correctness of the auditor, ProveLog is not necessary. Otherwise, ProveLog can without doubt prove or disprove the honesty of A as it has access to the secret information of A. The algorithm ProveLog takes as input the tag $\tau$ of the auditor and a log file $\Lambda$ and outputs a binary variable $dec_\Lambda^{corr}$ which is either TRUE or FALSE, indicating whether the POR protocol run that produced the log file has been correctly executed by the auditor. Formally:

$$dec_\Lambda^{corr}:=\text{ProveLog}(\tau,\Lambda)$$

The definition of correctness requires that if all parties are honest, i.e., H={U, A, S}, then the auditor always, i.e., with probability 1, accepts at the end of each POR protocol run and likewise the user at the end of each CheckLog protocol run. This should hold for any choice of key pairs and for any file M∈{0, 1}*. Likewise, if the POR protocol has been executed correctly by the auditor based on $\tau$ and yielded an output $\Lambda$, then the output of ProveLog($\tau$, $\Lambda$) should be TRUE with probability 1.

In summary, at least one embodiment enables verification of a proof of retrievability by creating cryptographically secure log entries so that the correctness of the verification process can be efficiently checked.

At least one embodiment enables reliance on a public source an unpredictable randomness, for example Bitcoin in order to prevent the verifier from misbehaving when performing a proof of retrievability.

At least one embodiment provides a method for outsourcing a proof of retrievability comprising the steps of 1) encoding the information to be stored and exchanging credentials between the data owner, the storage provider and the external auditor, 2) verifying the correctness of the stored information by the external producing a log file for the data owner and using a public source of unpredictable randomness; 3) the data owner retrieving the log file and validating the verification done by the auditor.

At least one embodiment provides at least one of the following advantages: receiving higher guarantees on permanent data availability/integrity than done with today's service level agreement of data storage providers; outsourcing the verification to an independent auditor, so that no activity of the data owner is necessary; the possibility to retrieve and check the log file of the auditor at any time, to validate the work of the auditor; enables an establishing of a cyber security insurance market.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for proving retrievability of information, the method being performed in a memory available to one or more computation devices, wherein credentials between a user device, a storing device and an auditing device between each pair of the devices are exchanged and used for communication between them, the method comprising:
   a) encoding, by the user device or the auditing device, information to be stored on the storing device;
   b) storing the encoded information on the storing device;
   c) verifying that the stored information was stored correctly on the storage device by the auditing device using unpredictable random information;
   d) transmitting correctness information to the user device, the correctness information being secure and being generated based on the result of the verification by the auditing device; and
   e) validating the correctness information by the user device for proving retrievability of the stored information and the unpredictable random information,
   wherein a source for unpredictable random information is based on Bitcoin and is commonly used by the user device and the auditing device.

2. The method according to claim 1, wherein the auditing device is provided with contract information by the user device, wherein the contract information specifies a checking policy for the auditing device and/or the information to be proved for retrievability.

3. The method according to claim 1, wherein the stored information is different from the information to be stored, wherein the information to be stored is recoverable from the stored information.

4. The method according to claim 1, wherein an information dispersal algorithm is applied to the information to be stored prior to storing.

5. The method according to claim 1, wherein the correctness information is based on information of an external mutually trusted entity.

6. The method according to claim 1, wherein the correctness information is provided as a log-file by the auditing device.

7. The method according to claim 1, wherein step c) and/or step e) is based on a proof-of retrievability protocol.

8. The method according to claim 1, wherein the auditing device performs a proof-of-retrievability protocol with the storing device, and wherein the user device audits the auditing device using a proof-of-retrievability protocol.

9. The method according to claim 2, wherein the contract information includes at least one of the following: maximum interval within which the auditing device notifies the user device of an at least partial loss of said stored information and maximum failure tolerance.

10. A system for proving retrievability (POR) of information, the system comprising:
   a user device,
   a storing device, and
   an auditing device, wherein credentials between the user device, the storing device and the auditing device between each pair of the devices are exchanged and used for communication between them,
   wherein at least one of the user device or the auditing device is configured to encode the information to be stored on the storing device,
   wherein the user device is configured to validate correctness information for proving retrievability of the stored information using unpredictable random information,
   wherein the storing device is configured to store the encoded information,
   wherein the auditing device is configured to verify that the stored information was stored correctly on the storage device using the unpredictable random information, and to transmit correctness information to the user device, the correctness information being secure and being generated based on the result of the verification by the auditing device,
   wherein a source for unpredictable random information is based on Bitcoin and is commonly used by the user device and the auditing device.

11. A method for proving retrievability of information, the method being performed in a memory available to one or more computation devices, wherein credentials between a user device, a storing device and an auditing device between each pair of the devices are exchanged and used for communication between them, the method comprising:
   a) encoding, by the user device or the auditing device, information to be stored on the storing device;
   b) storing the encoded information on the storing device;
   c) verifying that the stored information was stored correctly on the storage device by the auditing device using unpredictable random information;
   d) transmitting correctness information to the user device, the correctness information being secure and being generated based on the result of the verification by the auditing device; and
   e) validating the correctness information by the user device for proving retrievability of the stored information and the unpredictable random information,
   wherein the auditing device is provided with contract information by the user device, wherein the contract information specifies a checking policy for the auditing device and/or the information to be proved for retrievability; and
   wherein the contract information includes at least one of the following: maximum interval within which the auditing device notifies the user device of an at least partial loss of said stored information and maximum failure tolerance.

* * * * *